March 14, 1950  H. L. BOWDITCH  2,500,657
DEVICE FOR ADJUSTING ANGULAR RELATIONSHIP
Filed June 24, 1947
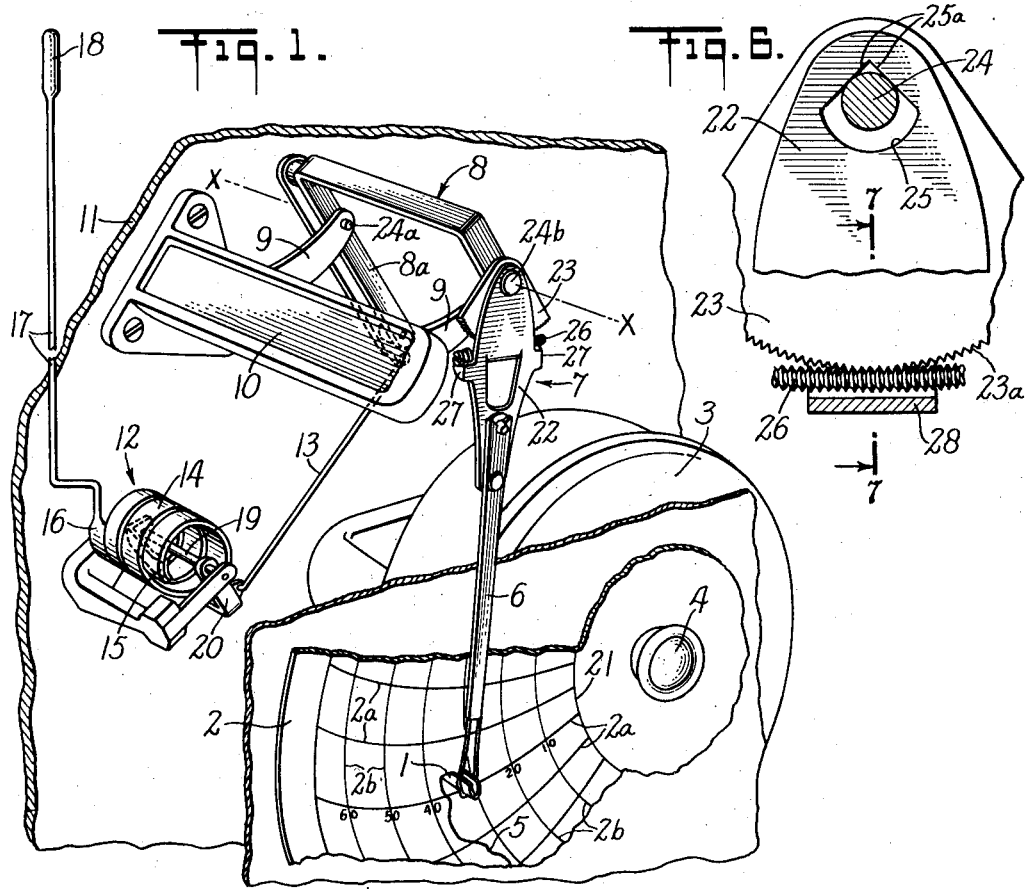
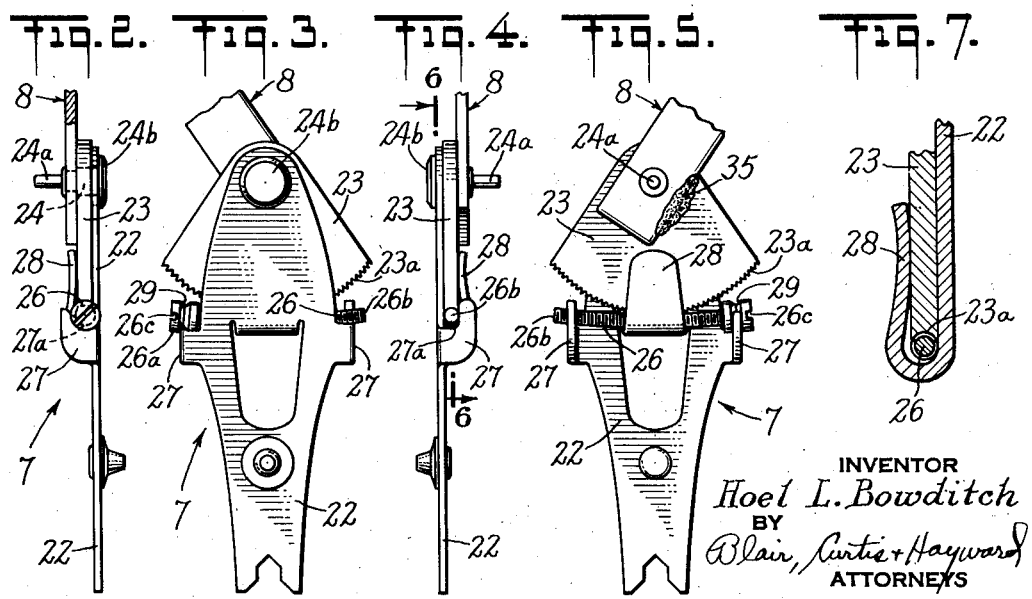
INVENTOR
Hoel L. Bowditch
BY
Blair, Curtis + Hayward
ATTORNEYS Patented Mar. 14, 1950

2,500,657

UNITED STATES PATENT OFFICE 2,500,657

DEVICE FOR ADJUSTING ANGULAR RELATIONSHIP

Hoel L. Bowditch, Jamaica Plain, Mass., assignor to The Foxboro Company, Foxboro, Mass.

Application June 24, 1947, Serial No. 756,597

5 Claims. (Cl. 346—33)

The illustrative embodiment of the invention relates to recording instruments and particularly to a novel mechanism for manually angularly adjusting a pen-arm about its pivotal support to co-relate the zero position of the pen with the zero position of a measuring element connected to operate the pivotal support and drive the pen-arm over a recording chart. Although shown applied to a recording mechanism, the invention is also useful for indicating instruments and for controlling instruments wherein manual angular adjustment between two pivoted parts is needed. The invention provides simple mechanism for making precise adjustment, free of back lash, and which adjustment holds securely until readjusted.

Other objects will be in part obvious and in part pointed out as the description proceeds.

Referring to the drawings in which corresponding reference numerals refer to corresponding parts, Figure 1 is a perspective view of mechanism embodying the invention applied to a recording instrument in which a measuring element moves a pen over a circular rotating chart to draw thereon a record of the performance of the measuring element;

Figure 2 is an enlarged right-side elevation of the pen-arm support of Figure 1;

Figure 3 is a front elevation of the pen-arm support of Figure 2;

Figure 4 is a left-side elevation of the pen-arm support of Figure 3;

Figure 5 is a back elevation of the pen-arm support of Figure 3;

Figure 6 is an enlarged fragmentary section taken on line 6—6 of Figure 4; and

Figure 7 is a detail section taken on line 7—7 of Figure 6.

Referring to Figure 1, a pen 1 is shown for drawing a line on a conventional circular chart 2 having radial time lines 2a and concentric lines 2b representing calibration indices. The chart is rotated by a conventional chart drive 3 through a supporting hub 4. The pen draws a line 5 on the chart and thereby records the value of temperature, pressure or other variable being measured. The pen is carried by pen-arm 6, detachably mounted upon pen-arm support 7 secured to U-shaft 8, pivoted upon arms 9 about axis X—X. Arms 9 are suitably supported by bracket post 10 secured to base plate 11, which plate also supports clock 3 and measuring element assembly 12. The measuring element assembly 12, through connecting link 13, pivots U-shaft 8 and operates pen 1.

The measuring element assembly is conventional. It includes a hollow helix 14 containing a fluid which as its pressure changes causes free end 15 of helix 14 to rotate. Fixed end 16 of the helix is connected by capillary tubing 17 to a condition-responsive bulb 18 which in the present embodiment is responsive to temperature. As the temperature increases, fluid pressure in bulb 18, tubing 17 and helix 14 increases, causing the helix to unwind and rotate shaft 19 to which the free end of the helix is connected. Shaft 19 carries lever 20 which, through link 13, drives U-shaft 8.

The problem solved by the invention is that of bringing pen 1 into alignment with the proper index 2b on the chart, i. e., the index corresponding to the value of the condition being measured by bulb 18. Thus for example, if bulb 18 is at zero temperature, then pen 1 must point to zero index 21. This act of bringing the pen into proper alignment with the chart and so to match its position with that of the measuring helix is commonly referred to as "zeroing the pen."

To accomplish the zeroing adjustment, pen-arm support 7 is angularly adjustable with respect to U-shaft 8. Thus with a known condition existing at bulb 18, the pen-arm support is angularly adjusted until pen 1 is moved to the proper index 2b.

It is an object of the present invention to provide mechanism, for making this adjustment, which mechanism is free from back lash, is easily manufactured and assembled, and which may be operated without need of a screwdriver or other tool, and which when adjusted holds its adjustment indefinitely regardless of such disturbing influences as vibrations.

Referring to Figures 1 and 3, the adjustment is made by angularly adjusting lever 22 which is part of pen-arm support 7 about a gear segment 23 which also is part of pen-arm support 7. Gear segment 23 is secured to the forward arm of U-shaft 8 by a stud shaft 24 shown partly in dotted lines in Figure 2 and by solder (indicated at 35 in Figure 5) between the U-shaft arm and gear segment. The stud shaft has a spindle 24a (similar to that shown in Figure 1) which is received by suitable bearings in the supporting arms 9. Stud shaft 24 is suitably secured to the arm of U-shaft 8 as by staking or soldering. Stud shaft 24 also passes through an opening 25 (Figure 6) in lever 22. Head 24b of stud shaft 24 holds lever 22 against the gear segment 23.

With this construction lever 22 is free to pivot about stud shaft 24 but is held snugly against the outer surface of gear segment 23. It is by pivoting lever 22 relative to gear segment 23 that the zeroing adjustment is made.

Pivoting of lever 22 about stud shaft 24 is accomplished by a worm-screw 26 which meshes with teeth 22a of gear segment 23. Referring to Figures 2 through 5, worm-screw 26 is rotatably supported from lever 22 by a pair of ears 27 extending rearwardly from lever 22 and having bearing-surfaces 27a and 27b which hold respectively the screw head 26a and the opposite screw end 26b. The alignment of bearing surfaces 27a is such that the worm-screw in extending between the bearings is flexed downwardly by its contact with gear segment 23. The resilient spring action of the flexed worm-screw 26 holds it tightly in its bearings and against the gear segment.

Bearing surface 27a is so sloped that the worm-screw in pressing against it is also pressed against the inside surface of lever 22 and so is held aligned with the plane of the gear segment. A tongue 28 (Figures 5 and 7) is struck from lever 22 and is bent around to clear worm-screw 26 and to resiliently press against the rear side of the gear segment to hold the lever 22 spring pressed against the surface of gear segment 23.

Head 26a of worm-screw 26 has an annular V-shaped groove 29 which receives (saddles upon) its bearing surfaces 27a. The force of the flexed worm-screw in forcing the bearing surface into the apex of the V-shaped groove maintains the screw at all times in the same axial alignment with respect to lever 22. In this way all back lash which would otherwise be caused by axial movement of screw 26 relative to lever 22 is eliminated.

Further to eliminate back lash or dead space, hole 25 of lever 22 is provided with angularly disposed faces 25a, forming a V-notch, which contact stud shaft 24. The force exerted by the flexed worm-screw 26 holds surfaces 25a against stud shaft 24 and prevents lateral movement of lever 22 with respect to gear segment 23.

With this construction, all possible sources of back lash and dead space are eliminated and at the same time the continuous flexing force exerted by screw 26 holds the parts tightly together against accidental movement which might otherwise be caused by vibration. But the flexure force permits relatively free turning of the worm-screw by a screwdriver blade or by a finger nail inserted in the usual slot 26c provided in the screw head 26a.

Also, because the worm-screw does not move axially, a large angular adjustment between lever 22 and the gear segment is possible with a relatively short worm-screw; the amount of the adjustment being limited only by the length of the arc of the gear segment.

Since many embodiments might be made of the present invention and since many changes might be made in the embodiment disclosed herein, it is to be understood that the foregoing description is to be interpreted as illustrative only and not in a limiting sense.

I claim:

1. For use in an instrument recording the value of a variable condition and including a measuring element, a shaft movable thereby and a pen-arm and pen supported by said shaft and movable over a chart to draw thereon a record of the condition, in combination, a gear-segment and a pen-arm support, one of which is fixed to the shaft and the other of which is pivotally secured thereto to provide for relative angular adjustment between the gear-segment and pen-arm support, a journal carried by said pen-arm support, a worm-screw rotatably held in said journal and flexed outwardly thereagainst by its threaded engagement with the teeth of said gear-segment, an annular part having a V-shaped cross section carried by said worm-screw for cooperating with said journal under the force of the flexed worm-screw to hold the worm-screw against axial movement as it is rotated in the journal to change the angular adjustment between the pen-arm support and gear-segment.

2. For use in an instrument recording the value of a variable condition and including a measuring element, a shaft movable thereby and a pen-arm and pen supported by said shaft and movable over a chart to draw thereon a record of the condition, in combination, a gear-segment member and a lever member, one of which is fixed to the shaft and the other of which is movable with respect thereto, a stud concentric with the axis of said gear-segment member and fixed with respect to the shaft, and passing through a V-notch in the member which is movable, spaced bearing parts on said lever member located beyond the radius of said gear-segment member, a worm-screw rotatably held in said bearing parts and flexed outwardly thereagainst by forcible contact with said gear-segment member, said worm-screw having an annular part, V-shaped in cross section, for cooperating with a bearing part under the force exerted by the flexed worm-screw to hold the worm-screw against axial movement as it is rotated in the bearing parts to change the angular adjustment between the gear-segment member and the lever member, and the resilience of the flexed worm-screw serving to push the member with the V-notch to hold the sides of the V-notch always against the stud, thereby to prevent lateral movement of the two members.

3. For use in an instrument recording the value of a variable condition and including a measuring element, a shaft movable thereby, and a pen-arm and pen supported by said shaft and movable over a chart to draw thereon a record of the condition, in combination, a gear-segment fixed to the shaft, a pen-arm support pivoted about the axis of said gear-segment, two bearings carried by said support, said bearings being spaced apart and aligned with the plane of the gear-segment and located beyond the radius of the gear-segment, a worm-screw rotatably held in said bearings and flexed outwardly thereagainst by forcible contact with said gear-segment, one end of said worm-screw having a V-shaped annular groove adapted to saddle upon one of said bearings and hold the worm-screw against axial movement with respect to the bearings when said screw is turned in the bearings to adjust angularly said pen-arm support with respect to said gear-segment.

4. In a mechanism for angularly adjusting two parts normally movable as a unit, in combination, a gear-segment member and a lever member, a stud secured with respect to one of the members and concentric with the axis of the gear-segment member and passing through a V-notch in the member to which the stud is not secured, spaced bearings on said lever member located beyond the radius of the gear-segment member, a worm-screw rotatably supported by said bearings and flexed outwardly by its forcible contact with the teeth of the gear-segment member, a head for rotating said worm-screw serving thereby to adjust angularly the gear-segment member with respect to the lever member, the resiliency of the worm-screw serving to urge the V-notch into contact with the stud and thereby prevent lateral movement between the gear-segment and lever member.

5. In a mechanism for angularly adjusting two parts normally movable as a unit, in combination, a gear-segment member and a lever member, a stud secured with respect to one of the members and concentric with the axis of the gear-segment member and passing through a V-notch in the member to which the stud is not secured, spaced bearings on said lever member located byond the radius of the gear-segment member, a worm-screw rotatably supported by said bearings and flexed outwardly by its forcible contact with the teeth of the gear-segment member, a head for rotating said worm-screw serving thereby to adjust angularly the gear-segment member with respect to the lever member, the resiliency of the worm-screw serving to urge the V-notch into contact with the stud and thereby prevent lateral movement between the gear-segment and lever members, and an annular part, V-shaped in cross section, carried by the worm-screw and cooperating with a bearing under the resilient force of the flexed worm-screw to hold the worm-screw against axial movement when it is rotated to adjust angularly the gear-segment and lever members.

HOEL L. BOWDITCH.

REFERENCES CITED

The following references are of record in the file of this patent:

UNITED STATES PATENTS

| Number | Name | Date |
| --- | --- | --- |
| 1,466,050 | Koski | Aug. 28, 1923 |
| 1,958,909 | Chappel et al. | May 15, 1934 |
| 2,245,784 | James | June 17, 1941 |
| 2,316,906 | Walt | Apr. 20, 1943 |